US012555001B2

(12) United States Patent
Cai et al.

(10) Patent No.: US 12,555,001 B2
(45) Date of Patent: Feb. 17, 2026

(54) TERMINAL POWER SUPPLY DEGRADATION DETECTION

(71) Applicant: NCR Atleos Corporation, Atlanta, GA (US)

(72) Inventors: Yingying Cai, Atlanta, GA (US); Ryan Albert Breeze, Guelph (CA); Kun Zhu, Smyrna, GA (US); Mena Guirguis, Mississauga (CA); Virginia-May Risebrough Barnes, Seagrave (CA)

(73) Assignee: NCR Atleos Corporation, Atlanta, GA (US)

( * ) Notice: Subject to any disclaimer, the term of this patent is extended or adjusted under 35 U.S.C. 154(b) by 766 days.

(21) Appl. No.: 17/823,142

(22) Filed: Aug. 30, 2022

(65) Prior Publication Data
US 2024/0070482 A1 Feb. 29, 2024

(51) Int. Cl.
*G06N 20/00* (2019.01)
*G06N 5/00* (2023.01)
*G06N 5/022* (2023.01)
*G06N 5/04* (2023.01)
*G06N 20/10* (2019.01)
(Continued)

(52) U.S. Cl.
CPC ............ *G06N 5/022* (2013.01); *G06N 5/04* (2013.01); *G06N 20/00* (2019.01); *G06N 20/10* (2019.01);
(Continued)

(58) Field of Classification Search
CPC .... G06Q 20/1085; G06Q 20/20; G07F 19/20; G07F 19/201–25; G07F 19/206;
(Continued)

(56) References Cited

U.S. PATENT DOCUMENTS 5,461,607 A * 10/1995 Miyagi .................. H04L 69/40
370/244
6,765,874 B1 * 7/2004 Carder ............... H04Q 11/0478
714/48
(Continued)

FOREIGN PATENT DOCUMENTS

EP 3889864 A1 * 10/2021
WO WO2012151198 A1 * 11/2012
WO WO2014141305 A2 * 9/2014

OTHER PUBLICATIONS

Ke Zhang et al., "Automated IT System Failure Prediction: A Deep Learning Approach", 2016 IEEE International Conference on Big Data (Big Data), pp. 1291-1300.*
(Continued)

*Primary Examiner* — Srirama Channavajjala
(74) *Attorney, Agent, or Firm* — Schwegman Lundberg & Woessner, P.A.

(57) ABSTRACT

Event streams of terminals for a given interval of time are preprocessed to label event types and label predefined time-based or sequence-based patterns associated with terminal power supply unit (PSU) failures. The labeled event streams are provided as input to a trained machine-learning model (MLM), which outputs a score for each terminal representing a likelihood that the corresponding terminal is or is not going to experience a PSU failure. In an embodiment, each score is compared against one or more threshold values and each terminal is classified as low risk, medium risk, or high risk of a PSU failure. In an embodiment, the scores and/or the classifications for the terminals are reported to an enterprise associated with the terminals at predefined intervals of time.

20 Claims, 5 Drawing Sheets

(51) Int. Cl.
*G06Q 20/10* (2012.01)
*G07F 9/00* (2006.01)
*G07F 19/00* (2006.01)
*G06Q 20/18* (2012.01)
*G06Q 20/20* (2012.01)

(52) U.S. Cl.
CPC ......... *G06Q 20/1085* (2013.01); *G07F 9/001* (2020.05); *G07F 9/002* (2020.05); *G07F 19/20* (2013.01); *G07F 19/209* (2013.01); *G06Q 20/18* (2013.01); *G06Q 20/20* (2013.01)

(58) Field of Classification Search
CPC .... G07F 19/208; G07F 19/209; G07F 19/211; G07F 9/001–002; G07F 9/209; G07F 9/20; G06N 5/022; G06N 20/00; G06N 5/04; G06N 20/10
See application file for complete search history.

(56) References Cited

U.S. PATENT DOCUMENTS

| | | | | |
|---|---|---|---|---|
| 7,464,046 | B2* | 12/2008 | Wilson | G06Q 30/0601 705/7.42 |
| 8,474,693 | B1* | 7/2013 | Myana | G07F 19/206 235/379 |
| 11,562,076 | B2* | 1/2023 | El-Moussa | H04L 63/1466 |
| 11,610,205 | B1* | 3/2023 | Fain | G06Q 20/1085 |
| 12,125,353 | B1* | 10/2024 | Nyamwange | G07F 19/207 |
| 2005/0010434 | A1* | 1/2005 | Sasajima | G07F 5/18 705/305 |
| 2009/0083182 | A1* | 3/2009 | Coventry | G06Q 20/382 705/73 |
| 2014/0084052 | A1* | 3/2014 | Wayne | G06Q 10/06 235/375 |
| 2017/0061407 | A1* | 3/2017 | Kuhn | G07F 19/206 |
| 2022/0005006 | A1* | 1/2022 | Wilson | G06K 19/06037 |
| 2022/0365841 | A1* | 11/2022 | Yamaguchi | G06F 11/0793 |

OTHER PUBLICATIONS

Michelle L. F. Cheong et al., "Ad-hoc automated teller machine failure forecast and field service optimization", 2015 IEEE International Conference on Automation Science and Engineering (CASE), Aug. 2015, pp. 1427-1433.*

A. Osmani et al., "Model-based diagnosis for fault management in ATM networks", 1999 2nd International Conference on ATM. ICATM'99 (Cat. No. 99EX284), Jun. 1999, pp.*

* cited by examiner

TERMINAL POWER SUPPLY DEGRADATION DETECTION

BACKGROUND

Automated teller machines (ATMs) enable customers of financial institutions to perform financial transactions, such as cash withdrawals, deposits, funds transfers, and balance inquiries or account information inquiries at any time and without the need for direct interaction with branch staff. ATMs provide convenience for customer of banks according to their schedules without the necessary dependence on bank operational hours and/or available of bank staff. It also allows banks to attract customers, ramp up service volume, and improve customer satisfaction without committing additional labor costs. Thus, when an ATM is out of service, banks and customers experience substantial inconveniences.

One type of problem that can result in an ATM being unavailable is power degradation failures. Power degradation issues with ATMs are hard to detect due to the lack of related machine data and the nature of deterioration. However, the issue prevents the ATM from operating with its entire functionality; the issue can also result in downtime that causes expense for the banks and causes inconvenience for the banks' customers.

When the problem surges, wrong parts are likely to be replaced and field technicians may need to take multiple trips to the ATM to completely resolve the real issue. Power degradation issues with ATMs are unlike media jams and other mechanical failures; there are three challenging characteristics.

First, there is no existing sensor that explicitly detects power supply unit (PSU) degradation issues; rather, the PSU degradation appears to be a slow process that evolves over time. Second, the symptoms of PSU degradation manifest as intermittent jams which run the risk of misleading field service technicians to replace cash handling parts, which not only increases cost of parts but also adds additional trips. Third, because identifying a root cause associated with PSU degradation is a challenge, the ATM continues to experience unexplained outages for prolonged periods of time, which adversely impacts the banks and their customers' experience. As a result, proactive detection of PSU degradation is needed.

SUMMARY

In various embodiments, methods and a system for terminal power supply degradation detection are presented. Events associated with terminals are preprocessed to label event types and event patterns known to be relevant to PSU failures. A machine-learning model (MLM) is trained on the labeled events and maintenance records for the terminals indicating whether or not the terminals experienced a PSU issue or a PSU failure. The MLM is trained to output a score representing a likelihood that a given terminal is or is not going to experience a PSU issue or a PSU failure. After training, events for the terminals are maintained for a predefined interval of time that includes current events for the terminals. The predefined interval of events are preprocessed and labeled with the event types and the event patterns and passed as input to the MLM. The MLM outputs a score per terminal. The scores for the terminals are reported to an enterprise associated with the terminals. In an embodiment, each score is compared against one or more threshold values and each terminal is classified as low risk, medium risk, or high risk. In an embodiment, the terminals, their scores, and their classifications are reported to the enterprise.

According to an aspect, a method of terminal power supply degradation detection is presented.

DETAILED DESCRIPTION

As stated above, detecting PSU degradation in a terminal is problematic. There is no one error condition nor hardware sensor that can properly identify PSU degradation. Any identified error condition can result in performing maintenance on other parts of the terminal that are completely unnecessary and not result the underlying PSU issue. The industry lacks any real understanding of how to identify PSU issues and even though PSU failures are uncommon, when they do occur, they cause significant expense and terminal downtime.

In fact, terminal function disruption is a major setback considering the benefits and convenience a self-service terminal (SST) provides to enterprises and their customers. Among all the potential hardware and software issues with a terminal, PSU degradation is the hardest to diagnose and resolve.

The system and methods discussed herein and below provide a proactive technique by which terminal PSU degradation problems/issues can be detected/identified and addressed before PSU failure occurs and before any substantial disruptions to the performance of the terminal are experienced. Events associated with maintenance informational warnings, statuses, correction actions taken, and/or malfunctions are collected for a terminal. The events are preprocessed and select combinations of the events are labeled as input features. A machine-learning model (MLM) is trained on the input features to predict different degrees of potential PSU degradation and/or failures for the PSU for the terminal using actual historical maintenance records for the terminal. The predictions are expressed as a score that is provided to an enterprise via a cloud service. The enterprise can use the score in systems of the enterprise for purposes of taking no action, closely monitoring subsequent scores for the terminal, and/or proactively taking an action to replace the PSU of the terminal based on comparing the score against enterprise-set threshold values.

Figure 1:
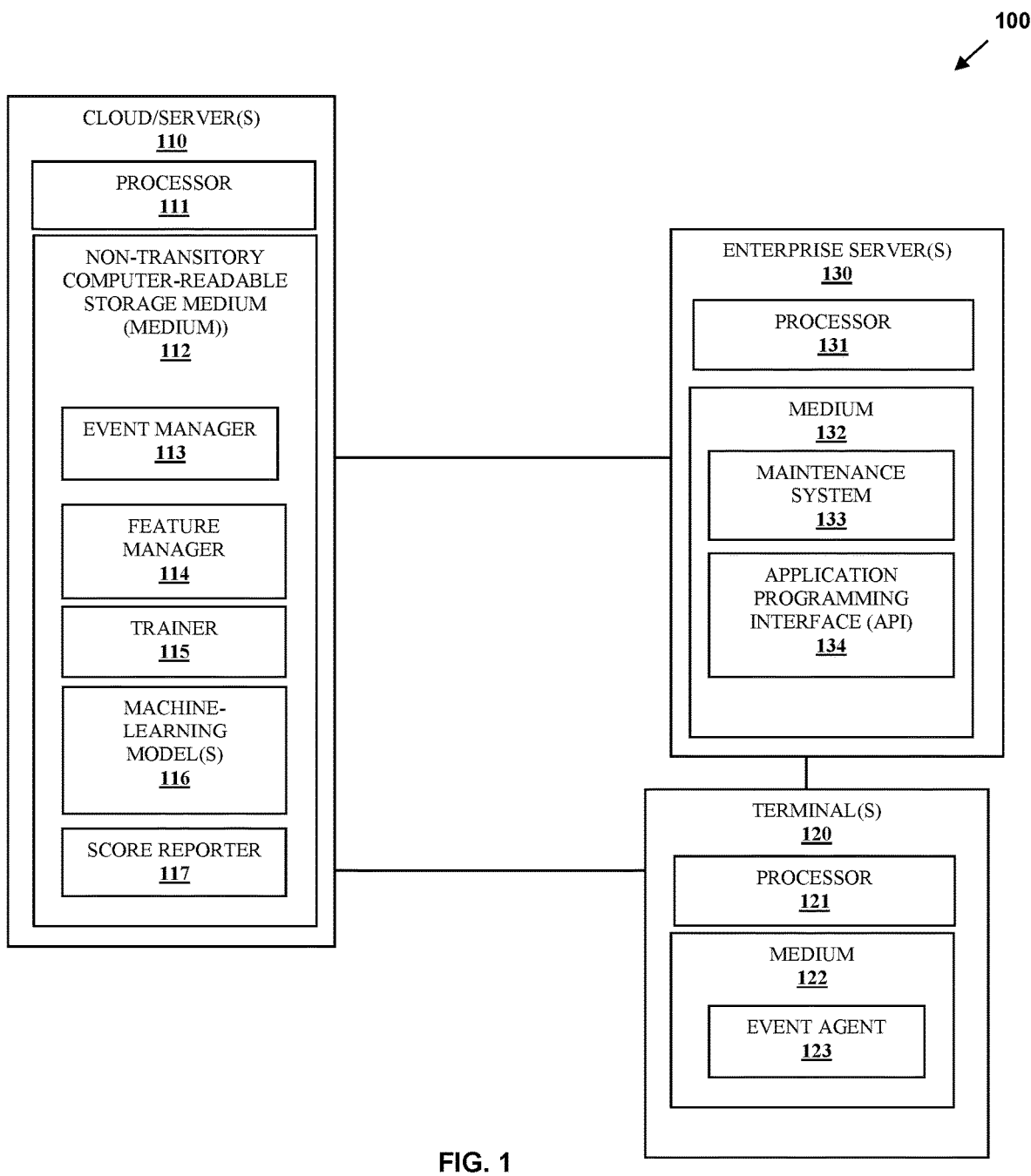
FIG. 1 is a diagram of system for detecting terminal power supply degradation, according to an example embodiment.

FIG. 1 is a diagram of a system 100 for detecting terminal PSU degradation before a PSU failure, according to an example embodiment. It is to be noted that the components are shown schematically in greatly simplified form, with only those components relevant to understanding of the embodiments being illustrated.

Furthermore, the various components (that are identified in the FIG. 1A) are illustrated and the arrangement of the components is presented for purposes of illustration only. It is to be noted that other arrangements with more or fewer components are possible without departing from the teachings of terminal PSU power degradation detection, presented herein and below.

System 100 includes a cloud 110 or a server 110, one or more enterprise servers 130, and terminals 120 associated with the enterprise servers 130. The cloud 110 or server 110 (hereinafter just "cloud 110") includes at least one processor 111 and a non-transitory computer-readable storage medium (hereinafter just "medium") 112, which includes executable instructions for an event manager 113, a feature manager 114, a trainer 115, a machine-learning model (MLM) 116, and a score reporter 117. When the executable instructions are provided to or obtained by processor 111, this causes the processor 111 to perform operations discussed herein and below for 113-117.

Each terminal 120 includes at least one processor 121 and medium 122, which includes executable instructions for an event agent 123. When the executable instructions are provided to or obtained by processor 121, this causes the processor 121 to perform operations discussed herein and below for 123.

Each enterprise server 130 includes at least one processor 131 and a medium, which includes executable instructions for a maintenance system 133 and an Application Programming Interface (API) 134. When the executable instructions are provided to or obtained by processor 131, this causes the processor 111 to perform operations discussed herein and below for 133-134.

Initially, historical maintenance records and events, which includes an event identifier and event data, are obtained for terminals 120 from maintenance system 133 by event manager 113 through API 134. Feature manager 114 segments the events by terminal 120 and by event type. The event can relate to terminal statuses, terminal maintenance actions, terminal informational warnings, and/or terminal failures. The event types can identify a particular machine component associated with the terminal 120, a particular self-correction action taken by the terminal 120, and/or a particular failure encountered during operation of the terminal 120.

Feature manager 114 then identifies predefined event types known to be associated with PSU degradation issues from the separated event types by terminal 120. The predefined event types are arranged in a time series of time sequence based on their time and date stamps by terminal 120. Feature manager 114 then parses each time series for each terminal 120 for purposes of identifying known patterns or sequences of events known to be associated with PSU degradation issues. The predefined event types and the patterns or sequences are labeled within the historical events. Next, each event type and/or each event identifying a PSU failure, a PSU issue, and/or a non-PSU issue with each of the terminals is identified from the historical maintenance records and labeled in the historical events as an expected output that a MLM 116, during training, is to provide when given a set of events for a given terminal labeled with the predefined event types and patterns/sequences as input. The labeled event types and time-series based event patterns/sequences are input features to the MLM 116 and the labels associated with PSU failures, PSU issues, and non-PSU issues are provided in the event streams as the expected output of the MLM 116 during training. The labeled historical event types, sequences, and expected outcomes (e.g., PSU issues, PSU failures, and non-PSU issues) are provided by feature manager 114 to trainer 115 as a training data set for training of the MLM 116.

Trainer 115 balances the training data between event streams per terminal 120 associated with PSU failures or PSU issues and event streams not associated with PSU failures or PSU issues and produces a modified training data set for all of the terminals 120 or some predefined subset of the terminals 120. A predefined portion of the modified training data sets are removed from the modified training data set and set aside as a testing data set for testing the MLM 116 following a training session.

Trainer 115 then trains the MLM 116 on the modified training data set. Following training, trainer 115 tests the accuracy of the MLM in predicting, via a score or a confidence value outputted by the MLM during training, PSU failures or PSU issues using the testing data set and based on the known event streams associated with and not associated with PSU failures or PSU issues labeled in the testing data set. When an acceptable level of accuracy or F1 score is obtained from the MLM 116 after training and testing, the MLM 116 is released as a portion of a cloud-based service to the enterprise server 130.

The cloud-based service is provided through 113-117 to the enterprise server 130 via score reporter 117. During operation of the cloud-based service, event manager 113 collects events or event streams from the terminals 120 via event agent 123 and/or via maintenance system 133. A preconfigured amount of events is maintained by event manager 113 for each terminal 120 based on a preconfigured amount of time. For example, events for a given terminal 120 are retained for a configurable period reaching back to a year, a month, a quarter of a year, a half of a year, or a week and extending to a current day.

The preconfigured amount of events per terminal are provided to the feature manager 114. The feature manager 114 then labels the event streams with the input features, such as the event types and the event patterns. The event streams with the labeled and preprocessed input features are then provided by feature manager 114 as input to the MLM 116 at preconfigured intervals of time, such as once a day, twice a day, once a week, once every two to three days, etc.

The MLM 116 outputs the predicted score as a scalar value per terminal 120 representing a probability or a likelihood (e.g., a percentage value between 0 and 1) that the corresponding terminal 120 is going to experience but has not yet experienced a PSU failure or a PSU issue. The predicted score is obtained by score reporter 117 and assembled in a report that provides the corresponding score per terminal 120. The report can be sorted from highest score to lowest score and/or sorted by terminal location (e.g., store or branch location) and further stored by highest score to lowest score per terminal location. Score reporter 113 then sends the report to maintenance system 133 using API 134. Alternatively or additionally, the report is sent to a designated contact individual associated with the enterprise using pre-established contact data for the individual. Alternatively or additionally, the report is published to a secure website monitored by individuals of the enterprise and/or monitored by automated applications associated with maintenance system 133.

Each enterprise can then establish predefined procedures for comparing values of the score against threshold values for ignoring a given score value, initiating closer monitoring of a given terminal 120 based on the score value, and performing a proactive action to schedule replacement of a PSU for a given terminal 120 based on the score value. In an embodiment, score reporter 117 performs the threshold value comparisons on behalf of a given enterprise and interacts with the corresponding maintenance system 133 via API 134 to initiate closer monitoring of a given terminal 120 or to schedule a PSU replacement for a given terminal 120.

An example operation of system 100 is now provided for a terminals 120 that are ATMs 120 for a given branch or set of branches of a financial institution (FI). Initially, event type sequences defining a pattern are identified for ATMs believed to be relevant to PSU issues or PSU failures. For example, status codes of S654 lower transport jam and 192 communications recovering that appear within a short duration of one another for ATM 120, such as 1.5-minute time frame, while there is no immediate (2-minute time frame before or after the S654 and 192 pattern) appearance of status codes of 170 reboot due to X, 171 reboot from Y, 172 reboot while in Y, 173 reboot for Z, and 039 reboot due to R indicates a pattern that is related to PSU failures. The frequency of such a pattern appearing for a given ATM 120 can be a good indication of a high-risk ATM 120 for PSU failure. The pattern of 192 communications recovering with an S654 lower transport jam that is not associated with an intervention associated with 171-172 or 039 (reboots of the ATM 120) can be identified and distinguished to avoid false positives.

Feature manager 114 labels the event streams (which include the statuses) and labels the predefined pattern. Feature manager 114 also labels an expected output from the event streams of PSU issue, PSU failure, and non-PSU failure for the ATMs and provides the labeled event streams with the input features and the expected output to trainer 115. Trainer 115 trains MLM 116 separates a portion of the training data set into a training portion and a testing portion and trains and test the MLM 116 for produce a prediction that has an acceptable F1 score or accuracy.

Event manager 113 collects and maintains ATM event streams that extend back in time for a preconfigured interval and at least daily obtains current event streams from the ATMs 120. The preconfigured interval event stream (which includes the current event stream) is provided, at least daily, to feature manager 114. Feature manager 114 labels the input features in the event stream with the event types and with the predefined patterns and provides the feature labeled event stream to MLM 116. The output of MLM is an ATM identifier and a score, the score representing a likelihood that each ATM 120 is to experience a PSU issue or a PSU failure. Score reporter 117 obtains the list of ATM identifiers and the corresponding scores, sorts by highest to lowest score, and/or software by ATM location and within the ATM location sorts by highest to lowest score. The sorted list represents a report or a data structure that is them provided to maintenance system 133 using API 134 and/or sent to a contact individual of the corresponding enterprise (e.g., bank or FI in the present example).

The scores outputted by the MLM 116 allows for terminal classifications by the enterprises for low-risk terminals 120, medium-risk terminals 120, and high-risk terminals 120. This allows the enterprise to establish manual or automated procedures/actions for each of the classifications. The classifications can be based on threshold values set by the enterprise and compared against the scores.

In an embodiment, the MLM 116 is a support vector machine (SVM) model. The SVM finds a hyperplane in N-dimensional space (N is the number of input features) that distinctly classifies the data points. The predefined patterns are the most common sequences that are most distinct to the terminals 120.

In an embodiment, terminals 120 can include self-service terminals (SST), ATMs, point-of-sale (POS) terminals, and/or kiosks. In an embodiment, 113-117 is provided as a software-as-a-service (SaaS) from cloud 110 to maintenance systems 113 of enterprises associated with enterprise servers 130.

Figure 2A:
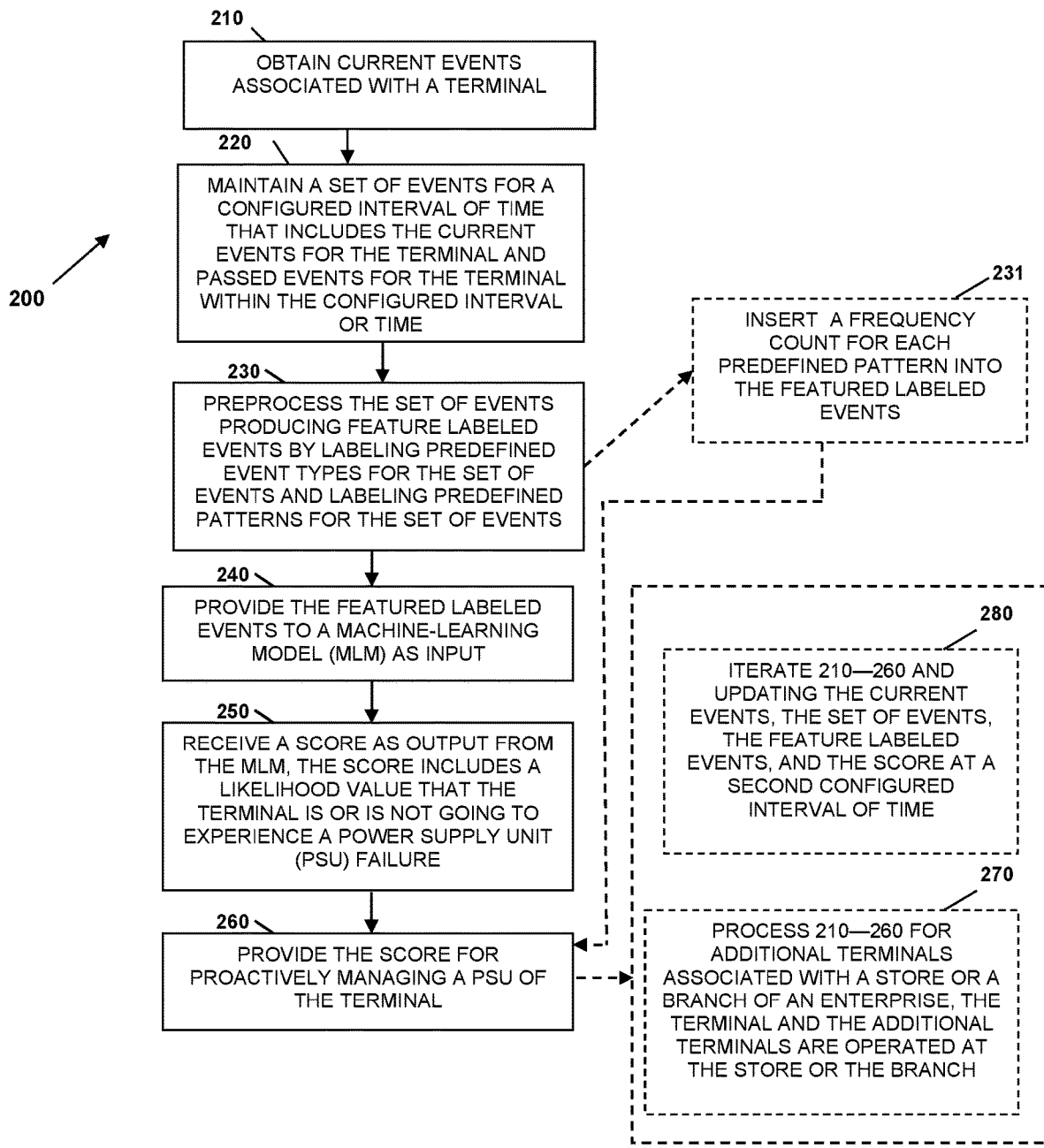
FIG. 2A is a flow diagram of a method for detecting terminal power supply degradation, according to an example embodiment.
Figure 2B:
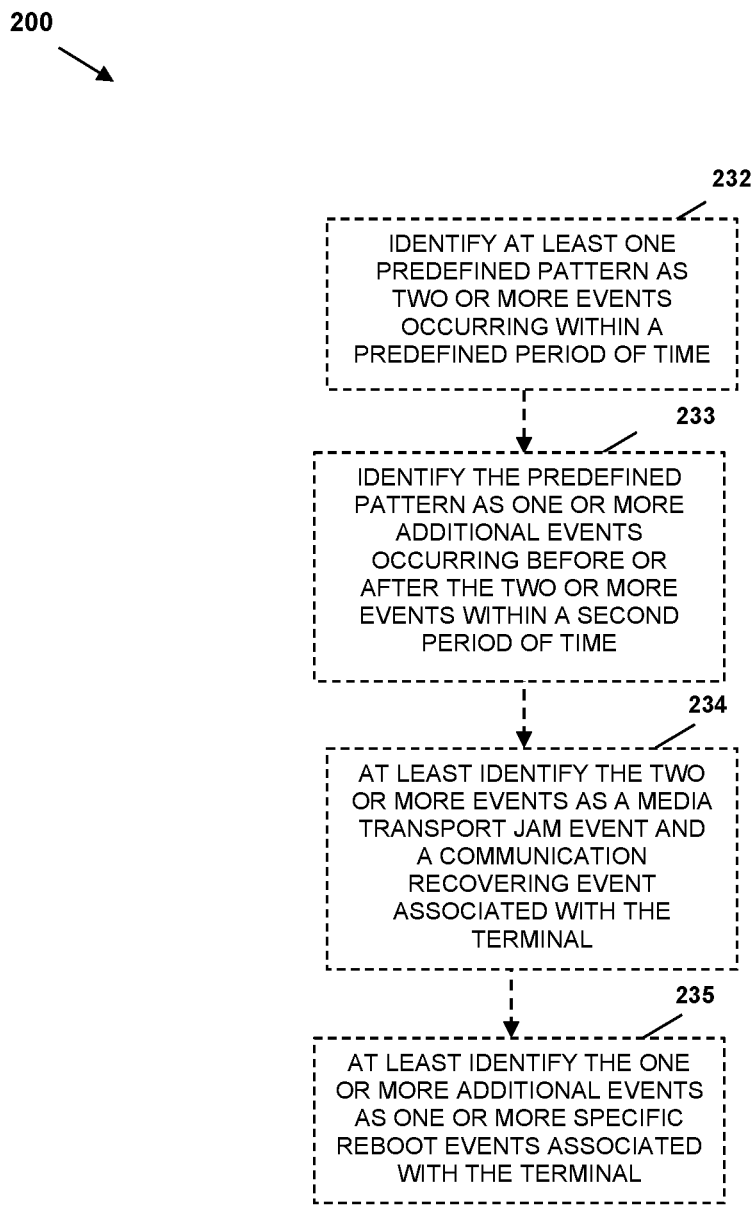
FIG. 2B is a flow diagram of embodiments of the method of FIG. 2A.

The above-referenced embodiments and other embodiments are now discussed with reference to FIGS. 2A, 2B, 3A, and 3B. FIGS. 2A and 2B are flow diagrams of a method 200 for detecting terminal PSU degradation before a PSU failure, according to an example embodiment. The software module(s) that implements the method 200 is referred to as an "terminal PSU failure predictor." The terminal PSU failure predictor is implemented as executable instructions programmed and residing within memory and/or a non-transitory computer-readable (processor-readable) storage medium and executed by one or more processors of a device or set of devices. The processor(s) of the device(s) that executes the terminal PSU failure predictor are specifically configured and programmed to process the terminal PSU failure predictor. The terminal PSU failure predictor can have access to one or more network connections during its processing. The network connections can be wired, wireless, or a combination of wired and wireless.

In an embodiment, the terminal PSU failure predictor executes cloud 110 or server 110. In an embodiment, the terminal PSU failure predictor executes on a specific retail server 130.

In an embodiment, the terminal PSU failure predictor is one, all, or some combination of 113, 114, 115, 116, and/or 117. In an embodiment, terminal PSU failure predictor presents another, and in some ways, an enhanced processing perspective from that which was discussed above with 113-118 of system 100.

At 210 (shown in FIG. 2A), the terminal PSU failure predictor obtains current events associated with a terminal 120. This can be done from an enterprise server 130 via API 134 and/or from an event agent 123 of the terminal 120.

At 220 (shown in FIG. 2A), the terminal PSU failure predictor maintains a set of events for a configured interval of time. The configured interval of time includes the current events and passed events for the terminal 120 that are within the current interval of time. In an embodiment, the configured interval of time is 1 year, 6 months, 3 months, 1 week, or less than 1 week.

At 230 (shown in FIG. 2A), the terminal PSU failure predictor preprocesses the set of events producing feature labeled events. This is done by labeling predefined event types for the set of events and labeling predefined patterns for the set of events.

In an embodiment, at 231 (shown in FIG. 2A), the terminal PSU failure predictor inserts a frequency count for each predefined pattern appearing in the featured labeled events into the featured labeled events. This is a unique frequency counter maintained in the featured labeled events for each unique predefined pattern.

In an embodiment, at 232 (shown in FIG. 2B), the terminal PSU failure predictor identifies at least one predefined pattern as two or more events occurring within a predefined period of time. In an embodiment, at 233 (shown in FIG. 2B), the terminal PSU failure predictor identifies the predefined pattern as one or more additional events occurring before or after the two or more events within a second period of time. In an embodiment, at 234 (shown in FIG.

2B), the terminal PSU failure predictor at least identifies the two or more events as a media transport jam event and a communication recovering event associated with the terminal 120. In an embodiment, at 235, the terminal PSU failure predictor at least identifies the one or more additional events as one or more specific reboot events associated with the terminal 120.

At 240 (shown in FIG. 2A), the terminal PSU failure predictor provides the featured labeled events to a MLM 116 as input. At 250 (shown in FIG. 2A), the terminal PSU failure predictor receives a score as output from the MLM 116. The score includes a likelihood value that the terminal 120 is or is not going to experience a PSU failure.

At 260 (shown in FIG. 2A), the terminal PSU failure predictor provides the score for proactively managing a PSU failure. This can be done in a variety of manners. For example, a terminal identifier for the terminal and the score can be reported to a maintenance system 133 of an enterprise server 130, the identifier and score can be sent to a contact individual associated with the enterprise that manages the terminal, the identifier and score can be published on a secure website monitored by automated applications or individuals of the enterprise, and/or the terminal identifier and the score can be evaluated by the terminal PSU failure predictor to determine whether to notify the enterprise or whether to schedule a PSU unit replacement for the terminal 120 though the enterprise's maintenance system 133 via API 134.

In an embodiment of 260 and 231 (shown in FIG. 2A by the dotted line connection between 231 and 260), the terminal PSU failure predictor produces a score for a plurality of terminals such that each terminal includes its own score from the MLM. In such a situation, the terminal PSU failure predictor can use the frequency counts associated with each terminal's score to adjust the scores by elevating rankings of failures higher when the corresponding terminal identifiers are associated with higher frequency counts for the predefined pattern.

In an embodiment, at 270 (shown in FIG. 2A), the terminal PSU failure predictor iterates back to 210 and updates the current events, the set of events, the featured labeled events, and the score at a second configured interval of time. In an embodiment, the second configured interval of time is once a day, three times a week, once a week, etc.

In an embodiment, at 280 (shown in FIG. 2A), the terminal PSU failure predictor processes for additional terminals 120 associated with a store or a branch of an enterprise. The terminals 120 and the additional terminals 120 are operated at the store or the branch. In an embodiment, the terminal 120 and the additional terminals 120 are ATMs operated and located at a bank branch of a FI.

Figure 3A:
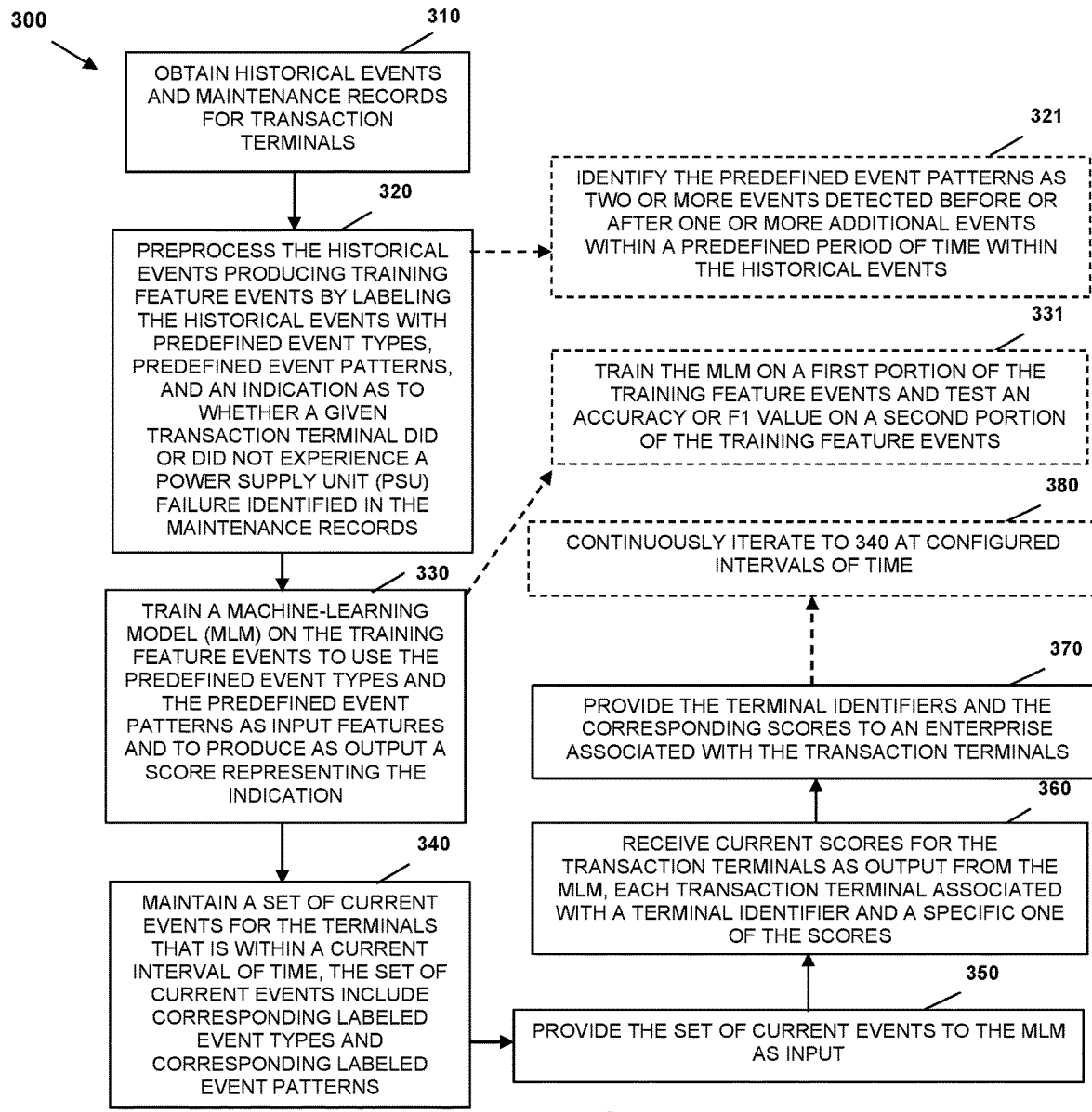
FIG. 3A is a flow diagram of another method for detecting terminal power supply degradation, according to an example embodiment.
Figure 3B:
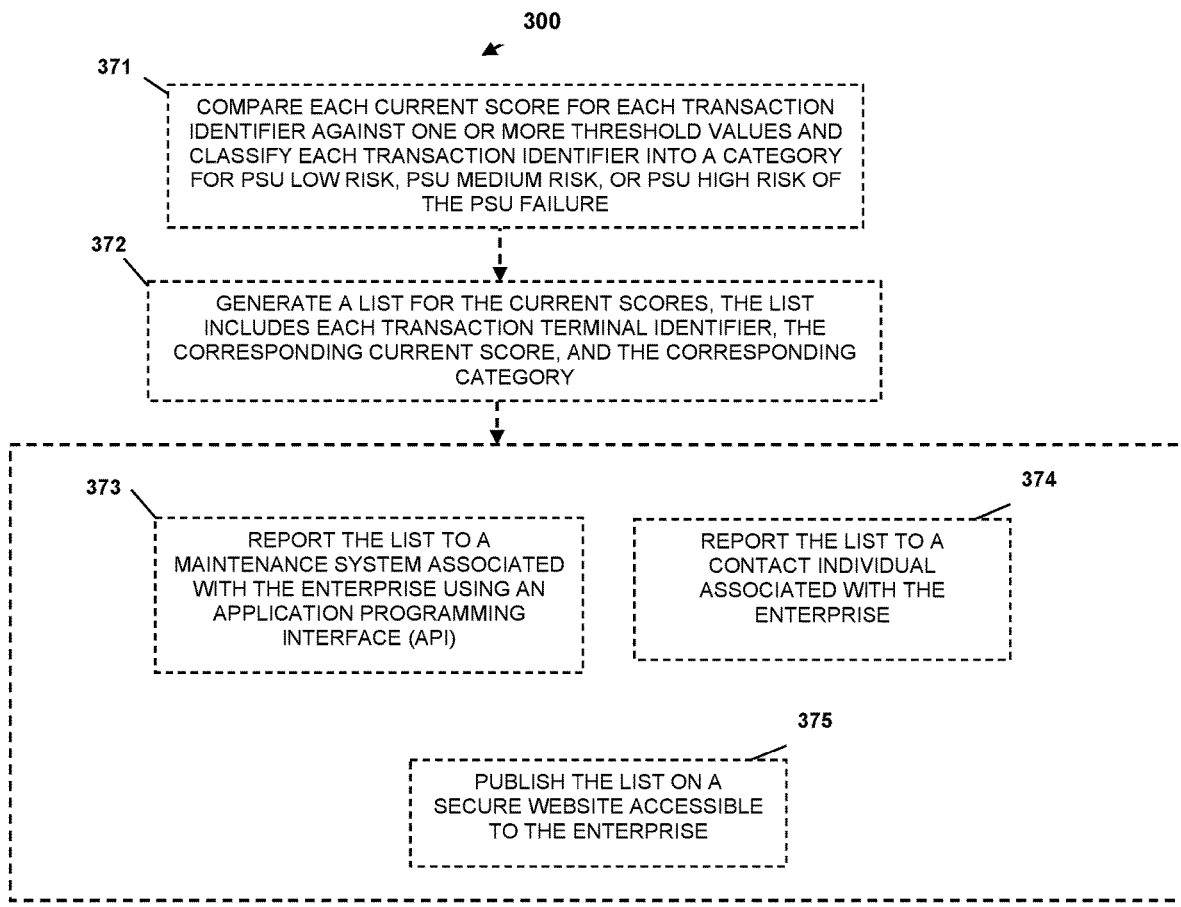
FIG. 3B is a flow diagram of embodiments of the method of FIG. 3A.

FIGS. 3A and 3B are flow diagrams of a method 300 for detecting terminal PSU degradation before a PSU failure, according to an example embodiment. The software module(s) that implements the method 300 is referred to as a "PSU failure monitor." The PSU failure monitor is implemented as executable instructions programmed and residing within memory and/or a non-transitory computer-readable (processor-readable) storage medium and executed by one or more processors of a device or set of devices. The processor(s) of the device that executes the PSU failure monitor are specifically configured and programmed to process the PSU failure monitor. The PSU failure monitor can have access to one or more network connections during its processing. The network connections can be wired, wireless, or a combination of wired and wireless.

In an embodiment, the device that executes PSU failure monitor is cloud 110 or server 110. In an embodiment, the device that executes the PSU failure monitor is a specific retail server 130.

In an embodiment, the PSU failure monitor is all of, or some combination of, 113, 114, 115, 116, 117, and/or method 200. The PSU failure monitor presents another and, in some ways, an enhanced processing perspective from that which was described above for 113-118 of system 100 and/or method 200.

At 310 (shown in FIG. 3A), the PSU failure monitor obtains historical events and maintenance records for transaction terminals 120. In an embodiment, the historical events and maintenance records are obtained from maintenance system 133 using API 134.

At 320 (shown in FIG. 3A), the PSU failure monitor preprocesses the historical events producing training feature events. This is done by labeling the historical events with predefined event types, predefined event patterns, and an indication as to whether a given transaction terminal 120 did or did not experience a PSU failure identified through the maintenance records.

In an embodiment, at 321 (shown in FIG. 3A), the PSU failure monitor identifies the predefined event patterns as two or more events detected before or after one or more additional events within a predefined period of time from the historical events. In an embodiment, the two or more events comprise a terminal media transport jam event and a communication recovery event, and the one or more additional events comprise specific types of reboots that occurred for the transaction terminal 120.

At 330 (shown in FIG. 3A), the PSU failure monitor trains a MLM 116 to use the predefined event types and the predefined event patterns as input features and to produce as output a score representing the corresponding indication for each transaction terminal 120. In an embodiment, at 331 (shown in FIG. 3A), the PSU failure monitor trains the MLM 116 on a first portion of the training feature events and tests an accuracy or F1 value of the MLM 116 on a second portion of the training feature events.

At 340 (shown in FIG. 3A), the PSU failure monitor maintains a set of current events for the terminals. The set of current events is within a current interval of time. The set of current events include corresponding labeled event types and corresponding labeled event patterns.

At 350 (shown in FIG. 3A), the PSU failure monitor provides the set of current events to the MLM 116 as input. At 360 (shown in FIG. 3A), the PSU failure monitor receives current scores for the transaction terminals 120 as output from the MLM 116. At 360 (shown in FIG. 3A), the PSU failure monitor receives current scores for the transaction terminals 120 as output from the MLM 116. Each transaction terminal 120 associated with a terminal identifier and a specific one of the scores.

At 370 (shown in FIG. 3A), the PSU failure monitor provides the terminal identifiers and the corresponding scores to an enterprise associated with the transaction terminals 120. This can be done in a variety of additive or alternative manners.

In an embodiment, at 371 (shown in FIG. 3B), the PSU failure monitor compares each current score for each transaction identifier against one or more threshold values. Based on each comparison, the PSU failure monitor classifies each transaction terminal identifier and its corresponding score into a category for PSU low risk of failure, PSU medium risk of failure, or PSU high risk of failure.

In an embodiment of 371 and at 372 (shown in FIG. 3B), the PSU failure monitor generates a list for the current scores. The list includes each transaction terminal identifier, the corresponding current score, and the corresponding assigned risk category determined at 371.

In an embodiment of 372 and at 373 (shown in FIG. 3B), the PSU failure monitor reports the list to a maintenance system 133 associated with the enterprise using an API 134. In an embodiment of 372 and at 373 (shown in FIG. 3B), the PSU failure monitor reports the list to a contact individual associated with the enterprise. In an embodiment of 372 and at 374 (shown in FIG. 3B), the PSU failure monitor publishes the list on a secure website accessible to individuals of the enterprise or an automated application of the enterprise that monitors the secure website. It is noted that 373, 374, and 375 may all be processed, some combination may be processed, or just one may be processed such that these embodiments are not mutually exclusive. In an embodiment, the list is sorted from highest to lowest score or from highest risk to lowest risk categories before being reported to the enterprise.

It should be appreciated that where software is described in a particular form (such as a component or module) this is merely to aid understanding and is not intended to limit how software that implements those functions can be architected or structured. For example, modules are illustrated as separate modules, but can be implemented as homogenous code, as individual components, some, but not all of these modules can be combined, or the functions can be implemented in software structured in any other convenient manner.

Furthermore, although the software modules are illustrated as executing on one piece of hardware, the software can be distributed over multiple processors or in any other convenient manner. The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus, the following claims are hereby incorporated into the Description of the Embodiments, with each claim standing on its own as a separate exemplary embodiment.

The invention claimed is:

1. A method, comprising:
   obtaining current events associated with a terminal;
   maintaining a set of events for a configured interval of time that includes the current events for the terminal and passed events for the terminal that are within the configured interval of time;
   preprocessing the set of events and producing feature labeled events by labeling predefined event types for the set of events and labeling predefined patterns for the set of events, wherein the predefined patterns include a specific pattern of a media transport jam event and a communication recovering event that appear within a predefined time frame, while there is no immediate appearance of specific reboot events within a second predefined time frame before or after the media transport jam event and a communication recovering pattern, the specific pattern being related to a specific power-supply unit (PSU) failure;
   providing the feature labeled events to a support vector machine (SVM) model as a machine-learning model (MLM) as input, wherein the SVM model finds a hyperplane in N-dimensional space where N is a number of input features that distinctly classifies data points;
   receiving a score as output from the MLM, where the score comprises a likelihood value that indicates whether the terminal is going to experience a PSU failure; and
   providing the score for proactively managing a PSU of the terminal.

2. The method of claim 1 further comprising, processing the method for additional terminals associated with a store or a branch of an enterprise and wherein the terminal and the additional terminals are operated at the store or the branch.

3. The method of claim 1 further comprising, iterating the method updating the current events, the set of events, the feature labeled events, and the score at a second configured interval of time.

4. The method of claim 1, wherein preprocessing further includes identifying at least one predefined pattern as two or more events occurring within a predefined period of time.

5. The method of claim 4, wherein identifying further includes identifying the at least one predefined pattern as one or more additional events occurring before of after the two or more events within a second predefined period of time.

6. The method of claim 5, wherein identifying further includes at least identifying the two or more events as a media transport jam event and a communication recovering event associated with the terminal.

7. The method of claim 6, wherein identifying further includes at least identifying the one or more additional events as one or more specific reboot events associated with the terminal.

8. The method of claim 1, wherein preprocessing further includes inserting a frequency count for each predefined pattern into the feature labeled events.

9. A method, comprising:
   obtaining historical events and maintenance records for transaction terminals;
   preprocessing the historical events producing training feature events by labeling the historical events with predefined event types, predefined event patterns, and an indication as to whether a given terminal did experience a Power Supply Unit (PSU) failure identified in the maintenance records, wherein the predefined event patterns include a specific pattern of a media transport jam event and a communication recovering event that appear within a predefined time gram, while there is no immediate appearance of specific reboot events within a second predefined time frame before or after the media transport jam event and a communication recovery pattern, the specific pattern being related to a specific PSU failure;
   training a support vector machine (SVM model as a machine-learning model (MLM) on the training feature events to use the predefined event types and the predefined event patterns as input features and to produce as output a score representing the indication, wherein the SVM model finds a hyperplane in N-dimensional space where N is a number of input features that distinctly classifies data points;

maintaining a set of current events for the transaction terminals that is within a current interval of time, wherein the set of current events comprise corresponding labeled event types and corresponding labeled event patterns;

providing the set of current events to the MLM as input;

receiving current scores for the transaction terminals as output from the MLM, each transaction terminal associated with a terminal identifier and a specific one of the current scores; and providing terminal terminal identifiers and corresponding current scores to an enterprise associated with the transaction terminals.

10. The method of claim 9, preprocessing further includes identifying the predefined event patterns as two or more events detected before or after one or more additional events within a predefined period of time within the historical events.

11. The method of claim 9, wherein training further includes training the MLM on a first portion of the training feature events and testing an accuracy metric value on a second portion of the training feature events.

12. The method of claim 9, wherein providing further includes comparing each current score for each transaction identifier against one or more threshold values and classifying each transaction identifier into a category for PSU low risk, PSU medium risk, or PSU high risk of the PSU failure.

13. The method of claim 12, wherein comparing further includes generating a list for the current scores, wherein the list comprises each transaction terminal identifier, a corresponding current score, and a corresponding category.

14. The method of claim 13, wherein generating further includes reporting the list to a maintenance system associated with the enterprise using an Application Programming Interface (API).

15. The method of claim 13, wherein generating further includes reporting the list to a contact individual associated with the enterprise.

16. The method of claim 13, wherein generating further includes publishing the list on a secure website accessible to the enterprise.

17. The method of claim 9 further comprising continuously iterating to the maintaining the set of current events at a configured interval of time.

18. A system, comprising:
transaction terminals;
a server comprises at least one processor and a non-transitory computer-readable storage medium;
the non-transitory computer-readable storage medium comprises executable instructions;
the executable instructions when executed by the at least one processor from the non-transitory computer-readable storage medium cause the at least one processor to perform operations comprising:
maintaining a current set of events for the transaction terminals that stays within a current period of time;
labeling the current set of events with event types and event patterns, wherein the event patterns include a specific pattern of a media transport jam event and a communication recovering event that appear within a predefined time frame, while there is no immediate appearance of specific reboot events within a second predefined time frame before or after the media transport jam event and a communication recovering pattern, the specific pattern being related to a specific power-supply unit (PSU) failure;
providing the current set of events to a support vector machine (SVM) model as a machine-learning model (MLM) as input, wherein the SVM model finds a hyperplane in N-dimensional space where N is a number of input features that distinctly classifies data points;
receiving, as output from the MLM, scores and transaction terminal identifiers, each score associated with a specific transaction terminal identifier for a specific transaction terminal, and each score representing a likelihood that indicates whether a corresponding transaction terminal is going to experience a PSU failure;
generating a list for the scores and the transaction terminal identifiers; and
managing maintenance of the transaction terminals using the list.

19. The system of claim 18, the operations further comprise:
sorting the list from highest score to lowest score;
adding to each entry in the list a category associated low risk of the PSU failure, medium risk of the PSU failure, or high risk of the PSU failure by comparing each score against one or more threshold values; and
reporting the list to an enterprise associated with the transaction terminals or publishing the list to a secure website accessible to the enterprise.

20. The system of claim 18, wherein the transaction terminals are one or more of self-service terminals (SSTs), point-of-sale (POS) terminals, automated teller machines (ATMs), and kiosks.

* * * * *